United States Patent
Chen et al.

(10) Patent No.: US 9,250,804 B2
(45) Date of Patent: Feb. 2, 2016

(54) ELECTRONIC DEVICE FOR DETECTING ERRONOUS KEY SELECTION ENTRY

(71) Applicants: Yonggang Chen, Suzhou (CN); Changhao Shi, Suzhou (CN); Jianxin Zhang, Shanghai (CN)

(72) Inventors: Yonggang Chen, Suzhou (CN); Changhao Shi, Suzhou (CN); Jianxin Zhang, Shanghai (CN)

(73) Assignee: FREESCALE SEMICONDUCTOR,INC., Austin, TX (US)

(*) Notice: Subject to any disclaimer, the term of this patent is extended or adjusted under 35 U.S.C. 154(b) by 363 days.

(21) Appl. No.: 13/957,449

(22) Filed: Aug. 2, 2013

(65) Prior Publication Data

US 2014/0218304 A1   Aug. 7, 2014

(30) Foreign Application Priority Data

Feb. 5, 2013 (CN) .......................... 2013 1 0044690

(51) Int. Cl.
*G06F 3/041* (2006.01)
*G06F 3/023* (2006.01)
*G06F 3/0488* (2013.01)

(52) U.S. Cl.
CPC .......... *G06F 3/04886* (2013.01); *G06F 3/0233* (2013.01); *G06F 3/0234* (2013.01); *G06F 3/0237* (2013.01)

(58) Field of Classification Search
CPC . G06F 3/0418; G06F 3/04886; G06F 3/0234; G06F 3/0237; G06F 3/0233
See application file for complete search history.

(56) References Cited

U.S. PATENT DOCUMENTS

| | | | |
|---|---|---|---|
| 5,650,597 A | 7/1997 | Redmayne | |
| 6,803,905 B1* | 10/2004 | Capps | G06F 3/04886 345/172 |
| 7,119,291 B2 | 10/2006 | Sun | |
| 7,903,092 B2* | 3/2011 | Philipp | H03K 17/9622 345/173 |
| 8,077,154 B2 | 12/2011 | Emig | |
| 8,212,159 B2 | 7/2012 | Stewart | |
| 8,232,972 B2 | 7/2012 | Huang | |
| 2007/0152983 A1 | 7/2007 | McKillop | |
| 2007/0236474 A1 | 10/2007 | Ramstein | |
| 2007/0268269 A1 | 11/2007 | Chang | |
| 2008/0122796 A1 | 5/2008 | Jobs et al. | |
| 2009/0174675 A1 | 7/2009 | Gillespie | |
| 2011/0199327 A1 | 8/2011 | Shin | |
| 2012/0001862 A1 | 1/2012 | Durbin | |
| 2012/0036468 A1* | 2/2012 | Colley | G06F 3/04886 715/773 |
| 2012/0050195 A1 | 3/2012 | Heo | |

* cited by examiner

*Primary Examiner* — Andrew Sasinowski
(74) *Attorney, Agent, or Firm* — Charles E. Bergere (57) ABSTRACT

An electronic device detects erroneous key selection entries or inaccurate actuation of a keypad. The device has a keypad with aligned keys. Each of the keys is partitioned into two sensor sub regions. A first one of the sub-regions includes at least a first sensor and a second one of the sub-regions includes a second sensor. A processor with a keypad sensor inputs is selectively coupled to the first and second sensors of each of the sub-regions. The second sensor of the first key and a proximal first sensor of an adjacent second key are coupled to a common keypad sensor input to provide indistinguishable sub-regions of adjacent keys. The processor is programmed to detect an erroneous key selection entry when only a key actuation signal is provided from the common keypad sensor.

17 Claims, 11 Drawing Sheets

ELECTRONIC DEVICE FOR DETECTING ERRONOUS KEY SELECTION ENTRY

BACKGROUND OF THE INVENTION

The present invention relates to touch sensors and, more particularly, to a method for detecting erroneous key selection when, for instance, a user's finger touches two adjacent keys of a key pad.

Touch sensor user interfaces, typically in the form of a designated touch sensitive keypad or touch screen, have been incorporated into a variety of electronic devices such as cellular telephones, portable entertainment devices and computers. Typically, a touch sensor user interface has a plurality of touch actuated sensors associated with a user input region typically comprising input keys. For example, a cellular telephone (touch screen smart phone) may include a touch sensor user interface with an array of input keys, with twenty six of the keys being designated to letters of the alphabet, ten of the keys being designated to each of the numbers from 0 to 9, and further addition keys being designated to punctuations, special symbols and function instructions.

Touch sensor user interfaces such as touch screens have a display area operable to detect the presence and location of a touch within the display area. The term touch generally refers to a contact to the display area by a finger or object such as a stylus or pen. Such touch screens typically work on the effects of a matrix of capacitors or resistors in which the capacitance or resistance variations within the matrix vary at the point of contact. From these variations, row and column coordinates of the matrix are determined and thus a key displayed on the screen at those coordinates can be determined. However, using this approach the identification of an actuated key can be relatively computationally complex especially for high resolution touch screens as many matrix coordinates can be associated with a single key.

One approach that reduces the computational complexity of determining an actuated key of a touch screen or designated touch sensitive keypad is by a firmware coded configuration. With such a configuration, each key is partitioned into two coded sub-regions and each sub-region has one or more detectors directly connected to an input of a processor. When both sub-regions detect concurrent contact from an object, the processor identifies the actuated key from signals sent from two sub regions. This approach is relatively computationally efficient. However, the coding of the sub-regions can result in erroneous keys being identified by the processer when, for instance, a finger touches one sub-region of a first key and another sub-region of an adjacent second key.

BRIEF DESCRIPTION OF THE DRAWINGS

The invention, together with objects and advantages thereof, may best be understood by reference to the following description of preferred embodiments together with the accompanying drawings in which.

DETAILED DESCRIPTION OF PREFERRED EMBODIMENTS

The detailed description set forth below in connection with the appended drawings is intended as a description of presently preferred embodiments of the invention, and is not intended to represent the only forms in which the present invention may be practiced. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that system, circuit, device components and method steps that comprises a list of elements or steps does not include only those elements but may include other elements or steps not expressly listed or inherent to such system, circuit, device components or steps. An element or step proceeded by "comprises . . . a" does not, without more constraints, preclude the existence of additional identical elements or steps that comprises the element or step.

In one embodiment of the present invention there is provided an electronic device comprising a keypad having a plurality of aligned keys, each of the keys being partitioned into two sensor sub regions, wherein a first one of the sub-regions includes at least one first sensor and a second one of the sub-regions includes at least one second sensor. There is also a processor with a plurality of keypad sensor inputs selectively coupled to the first sensor and second sensor of each of the sub regions. The processor is programmed to detect an erroneous key selection entry when key actuation signals are generated concurrently from a second sensor of a first key and a proximal first sensor of an adjacent second key.

In another embodiment of the present invention there is provided an electronic device comprising a keypad having a plurality of aligned keys, each of the keys being partitioned into two sensor sub regions, wherein a first one of the sub-regions includes at least one first sensor and a second one of the sub-regions includes at least one second sensor. There is also a processor with a plurality of keypad sensor inputs selectively coupled to the first sensor and second sensor of each of the sub-regions. The second sensor of the first key and a proximal first sensor of an adjacent second key are coupled to a common keypad sensor input to thereby provide indistinguishable sub-regions of adjacent keys. The processor is programmed to detect an erroneous key selection entry when only a key actuation signal is provided from the common keypad sensor.

In a further embodiment of the present invention there is provided a method for detecting an erroneous key selection entry, the key being one of a plurality of aligned keys a key of a keypad and each of the keys being partitioned into two sensor sub regions. A first one of the sub-regions includes at least one first sensor and a second one of the sub-regions includes at least one second sensor. The method is performed by a processor with a plurality of keypad sensor inputs selectively coupled to the first sensor and second sensor of each of the sub-regions. The method includes receiving key actuation signals sent from the sensors of two of the sub-regions, and processing the key actuation signals to detect an erroneous key selection entry when the key actuation signals are generated concurrently from a second sensor of a first key and a proximal first sensor of an adjacent second key.

Figure 1:
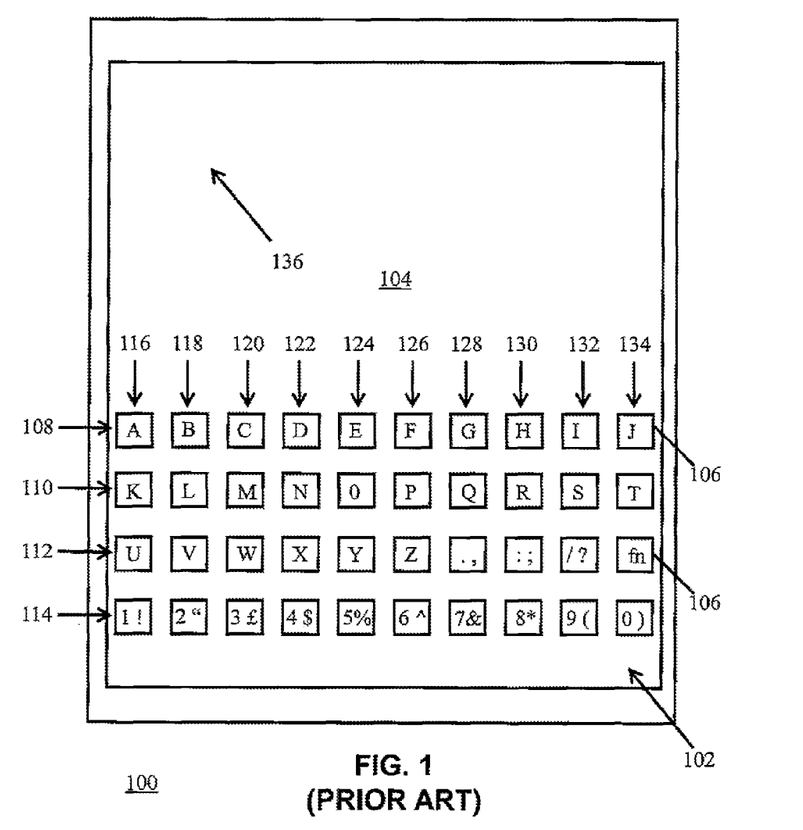
FIG. 1 illustrates an example of an electronic device with a conventional keypad.

Referring now to FIG. 1, an example of an electronic device 100 with a conventional keypad 102 is shown. The electronic device 100 can be any type of device and in this specific example the keypad 102 has a layout that is integrated into a touch screen 104. This specific keypad 102 comprises an array of keys 106 in parallel lines forming rows 108, 110, 112, 114 and further parallel lines forming columns 116, 118, 120, 122, 124, 126, 128, 130, 132, 134.

Displayed on each of the keys 106 is a symbol or symbols, used to identify text or commands that can be entered into the device 100 and, if necessary, displayed on the touch screen 104 in a designated character entry display area 136.

Figure 2:
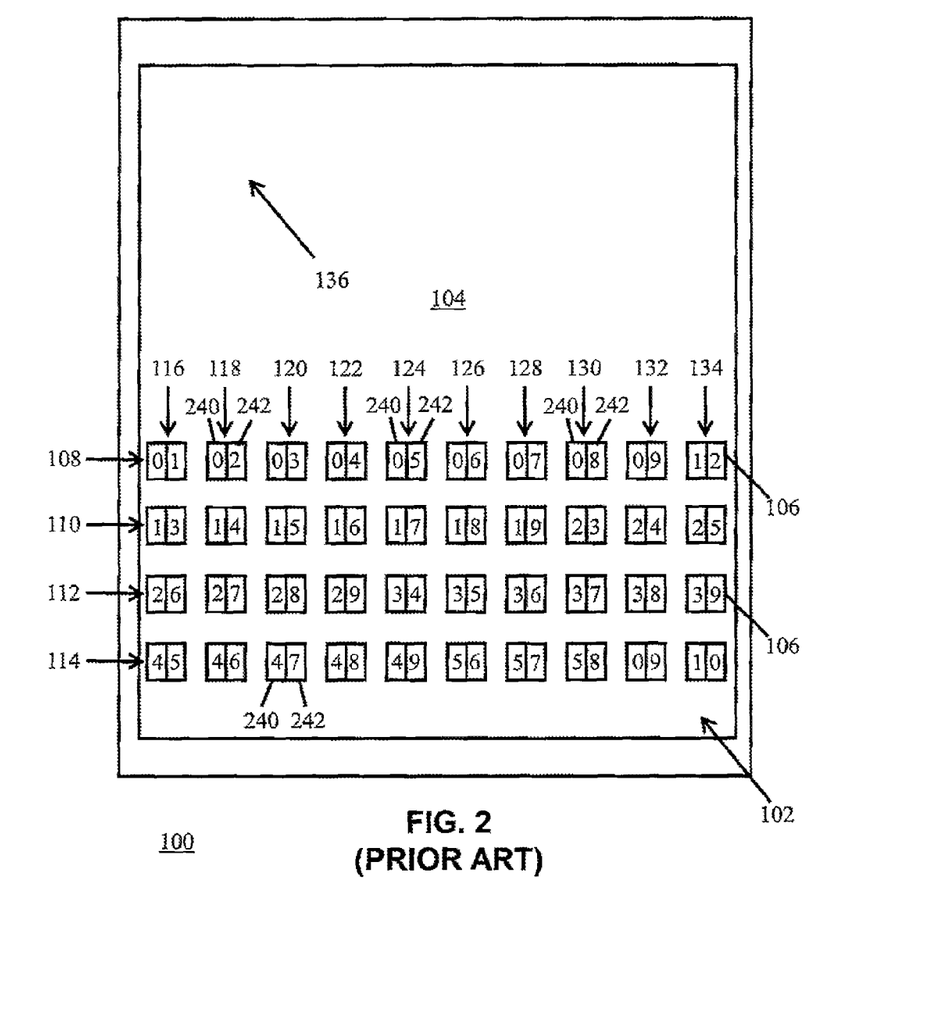
FIG. 2 illustrates an example of a conventional firmware coded keypad for use with the electronic device FIG. 1.

Referring to FIG. 2, an example of a conventional firmware coded keypad 102 for use with the electronic device 100 is shown. Each key 106 of the keypad 102 is partitioned into two sensor sub-regions these being a left or first sub-region 240 and a right or second sub-region 242. Each sub-region 240, 242 includes one or more touch sensors (such as capacitive or resistance touch sensitive sensors) and each touch sensor of a sub-region is coupled to a keypad sensor input of a processor (not shown) of the device 100.

The sub-regions 240, 242 are firmware coded such that the respective sensors of the first and second sub-regions 240, 242 of key "A" (Row 108, column 116) are coupled to respective keypad sensor inputs designated as inputs 0 and 1. Similarly, sensors for sub-regions 240, 242 of key "B" are coupled to respective keypad sensor inputs designated as inputs 0 and 2. For key "C" coupling is to keypad sensor inputs designated as inputs 0 and 3, key "D" has designated keypad sensor inputs 0 and 4 etc. In this prior art example, each key 106 has a distinguishable combined sensor coupling of two sub-regions 240, 242. However, when a user attempts to actuate, for example, key "B" but inaccurately touches the keypad 106 between key "A" and key "B", then the right sub-region 242 of key "A" and left sub-region 240 of key "B" will be detected. This will result in signals being sent to the sensor inputs designated as 1 and 0 thereby resulting in key "A" being errourosly entered into the device 100.

Figure 3:
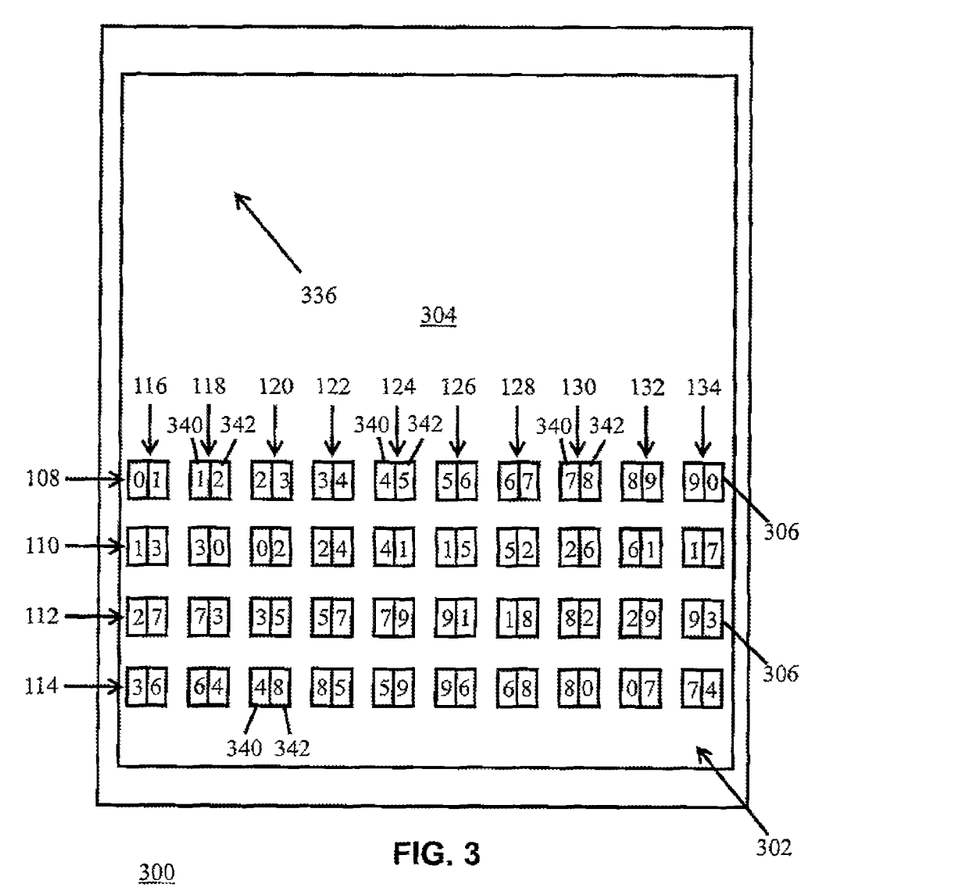
FIG. 3 illustrates an electronic device with a firmware coded keypad in accordance with a first preferred embodiment of the present invention.

Referring to FIG. 3, an electronic device 300 with a firmware coded keypad 302 in accordance with a first preferred embodiment of the present invention is shown. By way of illustration, the keypad 302 has an identical keypad layout to that of device 100 and thus keys 306 of the keypad 302 can be superimposed over keys 106 of the keypad 102 to identify the associated symbol for each key 306. The keypad 302 in this embodiment is integrated into a touch screen 304 with a designated character entry display area 336.

As shown, each key 306 is partitioned into two sensor sub-regions these being a left or first sub-region 340 and a right or second sub-region 342. Each sub-region 340, 342 includes one or more touch sensors (such as capacitive or resistance based touch sensitive sensors) and each touch sensor of a sub-region is coupled to a keypad sensor input of a processor (described later) of the electronic device 300.

The sub-regions 340, 342 are firmware coded such that the respective sensors of the first and second sub-regions 340, 342 of key "A" are coupled to respective keypad sensor inputs designated as inputs 0 and 1. The sensors for sub-regions 340, 342 of key "B" are coupled to respective keypad sensor inputs designated as inputs 1 and 2. For key "C" the sub-regions are designated as keypad sensor inputs 2 and 3, and key "D" has designated keypad sensor inputs 3 and 4. As will be apparent to a person skilled in the art, Key "A" refers to the character "A" being input to the device 300 upon actuation of the key "A", Key "B" refers to the character "B" being input to the device 300 upon actuation of the key "B", and so forth.

The firmware coding of the sub-regions 340, 342 in this embodiment is such that sensors of a right or second sub-region 342 and sensors of an adjacent left or first sub-region 340 are coupled to a common keypad sensor input. For example, key "A" has sensors of the second sub-region 342 coupled to the keypad sensor input 1 and key "B" also has sensors of the first sub-region 340 coupled to the keypad sensor input 1. Similarly, key "B" has sensors of the second sub-region 342 coupled to the keypad sensor input 2 and keypad "C" also has the sensors of the first sub-region 340 coupled to the keypad sensor input 2.

Figure 4:
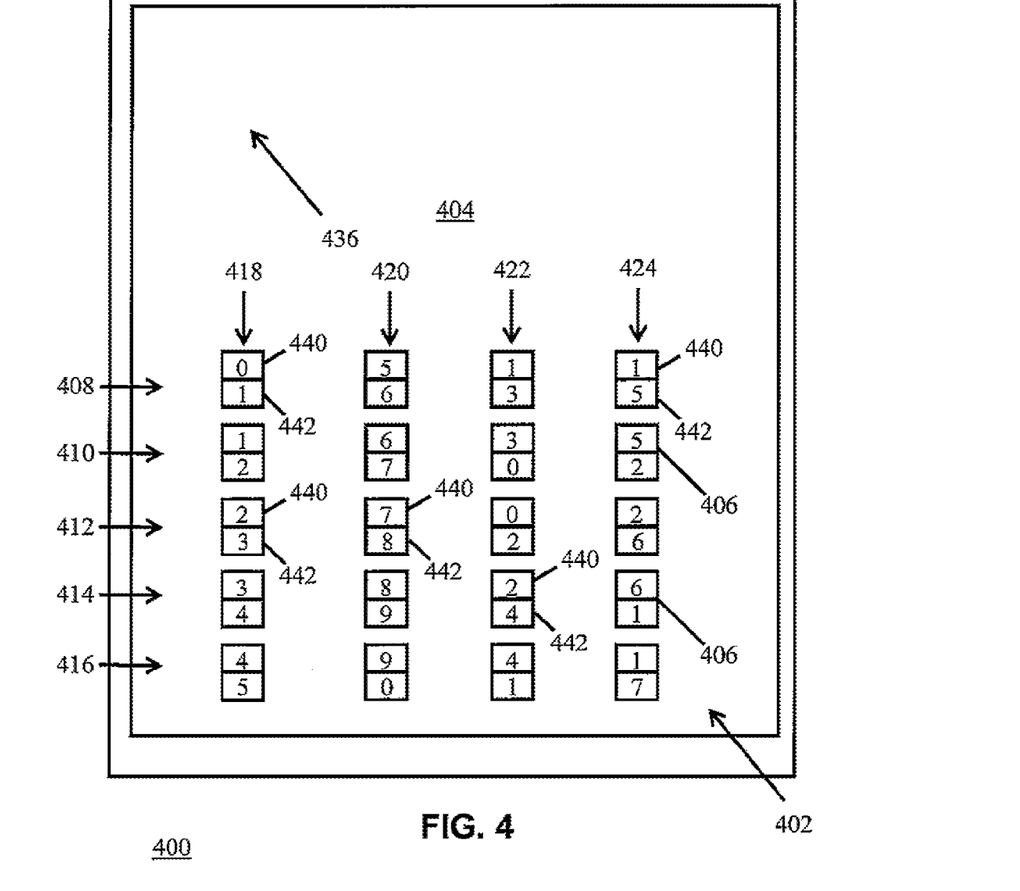
FIG. 4 illustrates an electronic device with a firmware coded keypad in accordance with a second preferred embodiment of the present invention.

Referring to FIG. 4, an electronic device 400 with a firmware coded keypad 402 in accordance with a second preferred embodiment of the present invention is illustrated. This specific keypad 402 is integrated into a touch screen 404. The keypad 402 in this embodiment comprises an array of keys 406 in parallel lines forming rows 408, 410, 412, 414, 416 and further parallel lines forming columns 418, 420, 422 and 424.

Each of the keys 406 has a displayed symbol or symbols (not illustrated) that identifies text or commands that can be entered into the device 400 and, if necessary, displayed on the touch screen 404 in a designated character entry display area 436.

As shown, each key 406 is partitioned into two sensor sub-regions these being an upper or first sub-region 440 and a lower or second sub-region 442. Each sub-region 440, 442 includes one or more touch sensors and each touch sensor of a sub-region is coupled to a keypad sensor input of a processor (described later) of the electronic device 400.

The sub-regions 440, 442 are firmware coded such that the respective sensors of the first and second sub-regions 440, 442 of a key "1" (ROW 408, column 418 are coupled to respective keypad sensor inputs designated as inputs 0 and 1. The sensor for sub-regions 440, 442 of a key "5" (row 410, column 418) are coupled to respective keypad sensor inputs designated as inputs 1 and 2. For a key "9" (row 412, column 418) the sub-regions are designated as keypad sensor inputs 2 and 3, and a function key (row 414, column 418) designates keypad sensor inputs 3 and 4. As will be apparent to a person skilled in the art, Key "1" refers to the character or numeral "1" being input to the device 400 upon actuation of the key "1", Key "5" refers to the character or numeral "5" being input to the device 300 upon actuation of the key "5", and so forth.

The firmware coding of the sub-regions 440, 442 in this embodiment is such that sensors of a lower or second sub-region 442 and sensors of an upper or first sub-region 440 are coupled to a common keypad sensor input. In this regard, key "1" has sensors of the lower or second sub-region 442 coupled to the keypad sensor input 1 and key "5" also has sensors as the lower or first sub-region 440 coupled to the keypad sensor input 1. Similarly, key "5" has sensors of the lower or second sub-region 442 coupled to the keypad sensor input 2 and key "9" also has the sensor of the upper or first sub-region 400 coupled to the keypad sensor input 2.

Figure 5:
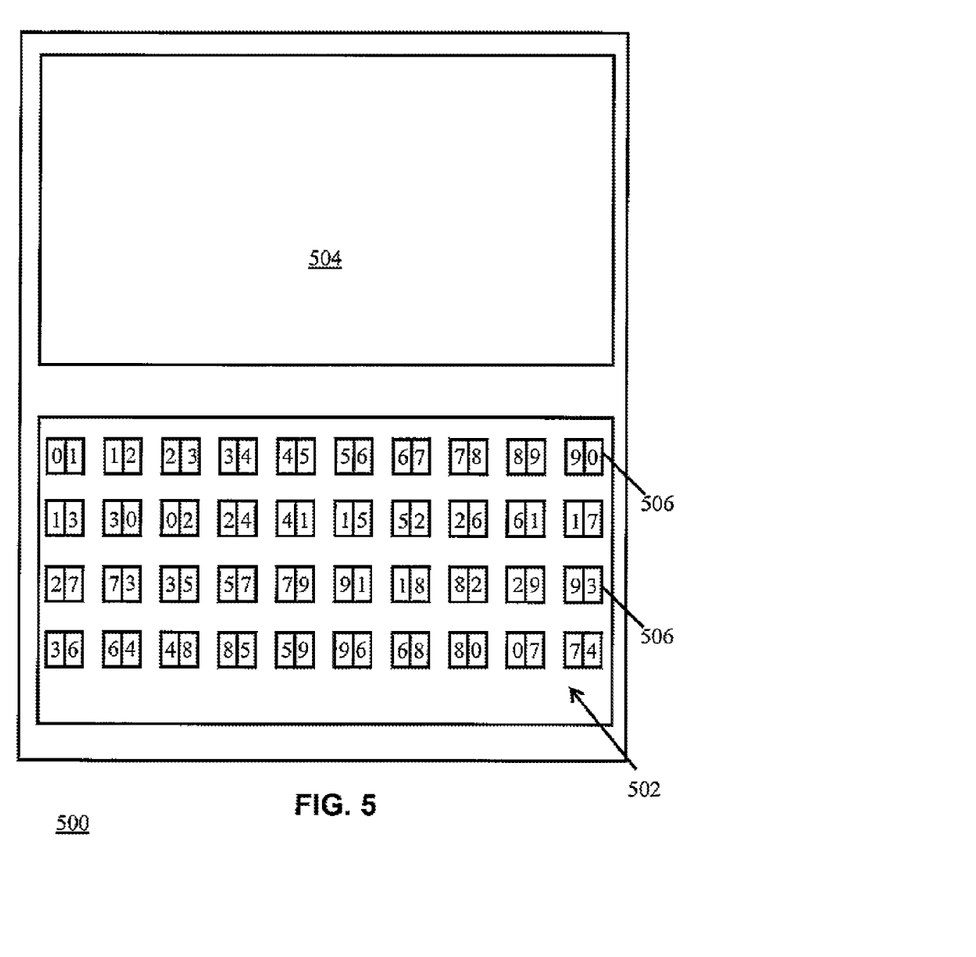
FIG. 5 illustrates an electronic device with a firmware coded keypad in accordance with a third preferred embodiment of the present invention.

Referring to FIG. 5, an electronic device 500 with a firmware coded keypad 502 in accordance with a third preferred embodiment of the present invention is shown. This specific keypad 502 is a touch sensitive pad with an array of keys 506 laid out and coded into sub-regions in an identical manner to the keys 306 of the electronic device 300. However, the device 500 has a separate display screen 504 for displaying characters entered into the device 500 by activation of the keys 506.

Since keypad 502 is not a display screen, the symbols (characters etc.) can be printed directly onto each key 506 or on next to each key 506 (typically above each key 506) as will be apparent to a person skilled in the art.

Figure 6:
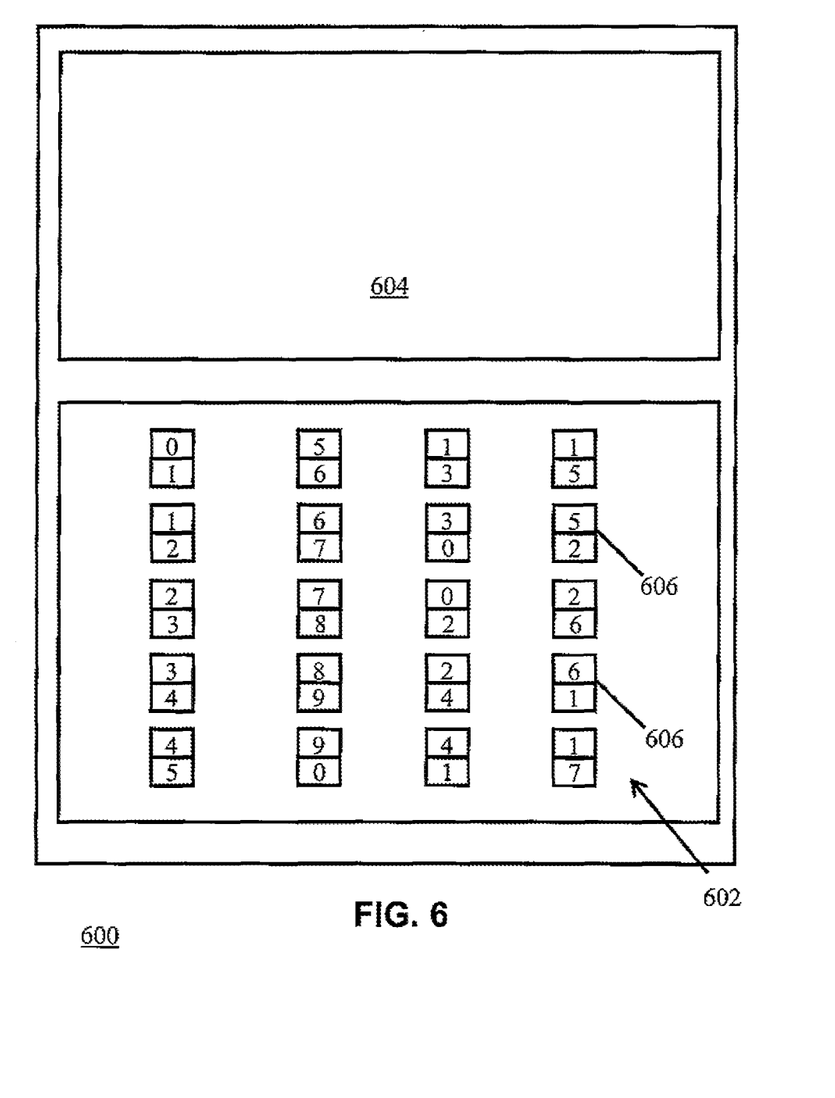
FIG. 6 illustrates an electronic device with a firmware coded keypad in accordance with a fourth preferred embodiment of the present invention.

FIG. 6, illustrates an electronic device 600 with a firmware coded keypad 602 in accordance with a fourth preferred embodiment of the present invention. This specific keypad 602 is a touch sensitive pad with an array of keys 606 laid out and coded into sub-regions in an identical manner to the keys 406 of the electronic device 400. However, the device 600 has a separate display screen 604 for displaying characters entered into the device 600 by actuation of the keys 606.

Since keypad 602 is not a display screen, symbols (characters) are printed directly onto each key 606 or next to each key 606 (typically above each key 606) as will be apparent to a person skilled in the art.

Figure 7:
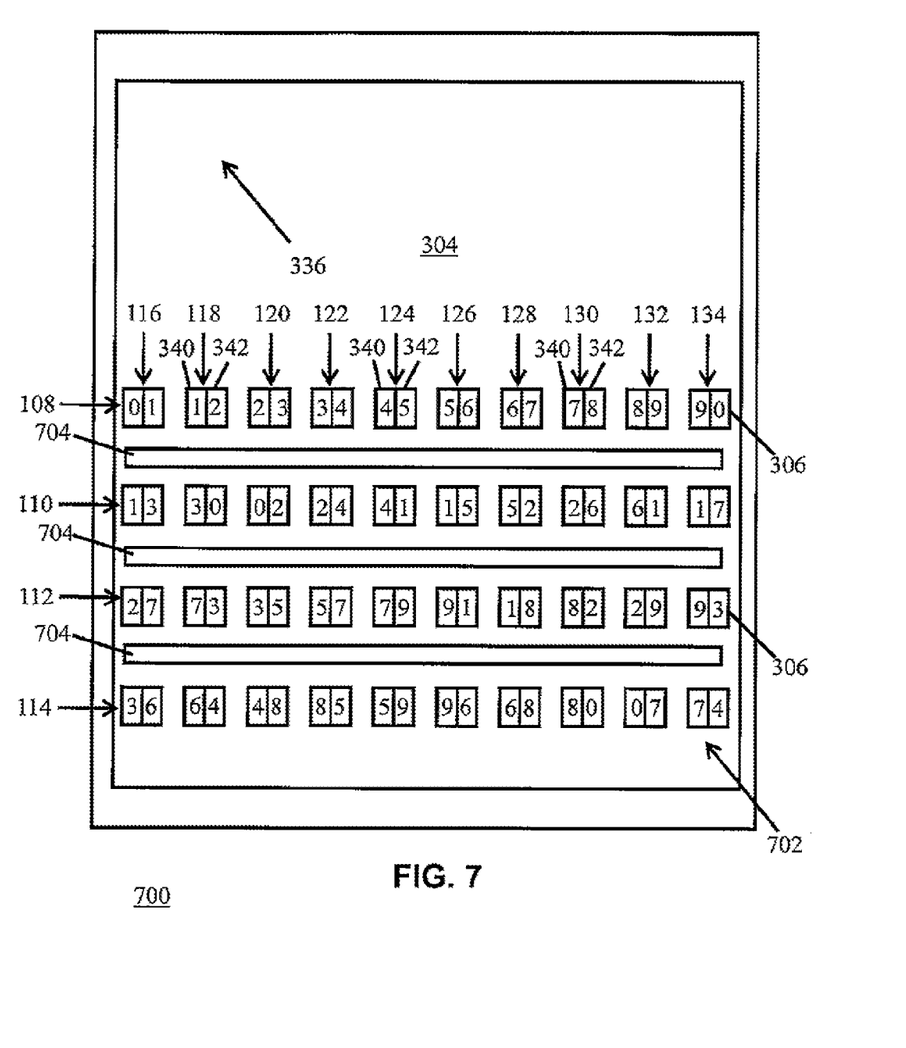
FIG. 7 illustrates an electronic device with a firmware coded keypad in accordance with a fifth preferred embodiment of the present invention.

Referring to FIG. 7, there is illustrated an electronic device 700 with a firmware coded keypad 702 in accordance with a fifth preferred embodiment of the present invention. The device 700 is almost identical to the device 300 and to avoid repetition only the differences will be described.

In this embodiment, the keypad 702 includes keys 306 laid out in a manner similar to that of keypad 302 and with identical firmware coded sub-regions 340, 342. The keypad 702 also includes an elongate error input sensor region 704 disposed between the first line or row 108 and the second line or row 110. Similarly, there is also an elongate error input region 704 between line or row 110 and line or row 412; and there is another elongate error input region 704 between line or row 112 and line or row 114.

Each elongate error input region 710 includes one or more touch sensors all coupled to a common designated keypad error sensor input of a processor.

Figure 8:
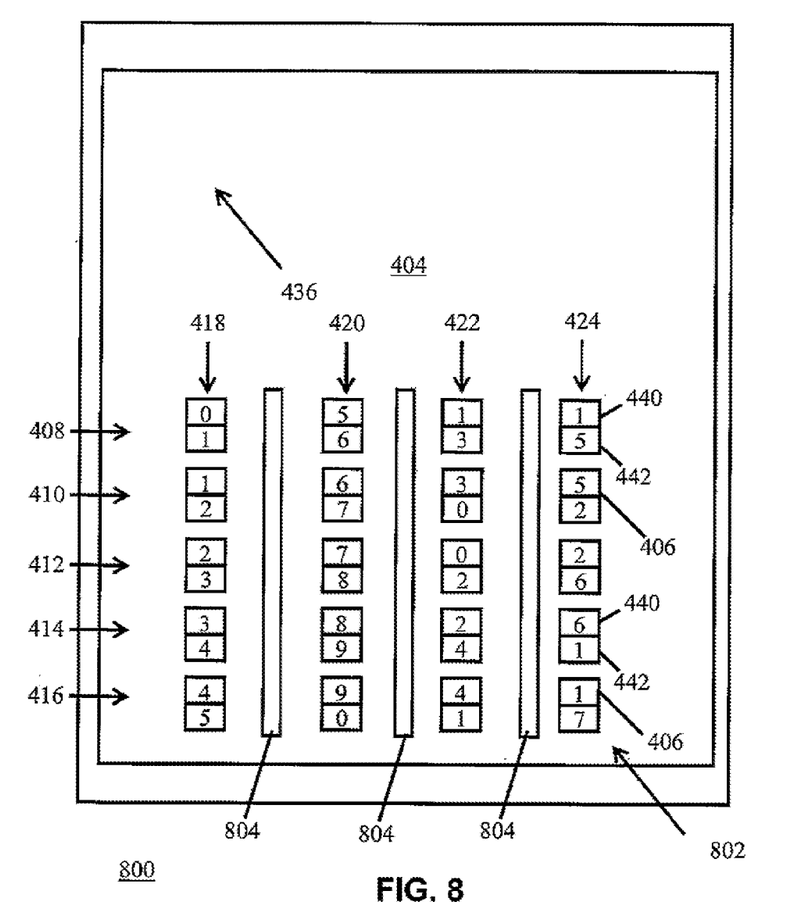
FIG. 8 illustrates an electronic device with a firmware coded keypad in accordance with a sixth preferred embodiment of the present invention.

Referring to FIG. 8, there is illustrated an electronic device 800 with a firmware coded keypad 802 in accordance with a sixth preferred embodiment of the present invention. The device 800 almost identical to the device 400 and to avoid repetition only the differences will be described.

In this embodiment, the keypad 802 includes an elongate error input sensor region 804 disposed between the first line or column 418 and second line or column 420. Similarly, there is also an elongate error input region 804 between line or column 420 and line or column 422; and there is another elongate error input region 804 between line or column 422 and line or column 424. Each elongate error input region 810 includes one or more touch sensors all coupled to a common designated keypad error sensor input of a processor.

Figure 9:
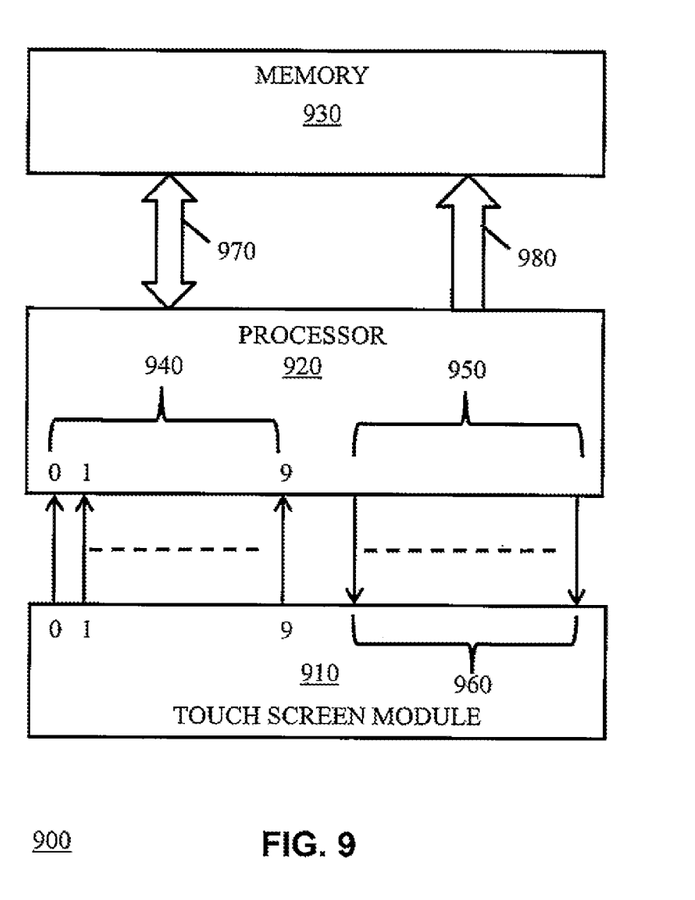
FIG. 9 illustrates a schematic diagram of circuitry forming part of the electronic device of FIG. 3, in accordance with a preferred embodiment of the present invention.

Referring to FIG. 9, there is illustrated a schematic diagram of circuitry 900 forming part of the electronic device 300, in accordance with a preferred embodiment of the present invention. However, the circuitry can also form part of the electronic device 400, 700 or 800. The circuit diagram 900 includes a touch screen module 910 that includes the touch screen 404 and displays the keypad 302, a processor 920 and a memory 930. The processor 920 has keypad sensor inputs 940 selectively coupled to sensors of each of the sub-regions 340, 342 and thus any of the sub-regions 340, 342 coded as 0 are coupled to keypad sensor input designated 0, sub-regions 340, 342 coded as 1 are coupled to keypad sensor input designated 1 etc. The processor 920 has touch screen control outputs 950 coupled to the control inputs 960 of the touch screen 910, and both a data bus 970 and an address bus 980 couple the processor to the memory 930.

Figure 10:
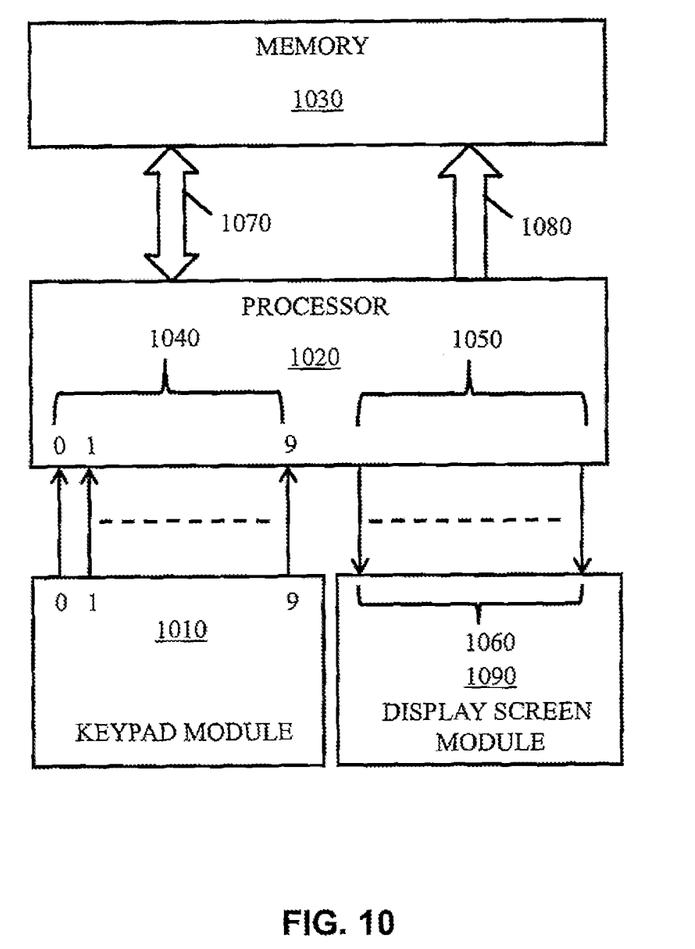
FIG. 10 illustrates a schematic diagram of circuitry forming part of the electronic device of FIG. 5, in accordance with a preferred embodiment of the present invention.

Referring to FIG. 10, there is illustrated a schematic diagram of circuitry 1000 forming part of the electronic device 500, in accordance with a preferred embodiment of the present invention. However, the circuitry can also form part of the electronic device 600. The circuit diagram 1000 includes a keypad module 1010 that includes the keypad 502, a processor 1020, a memory 1030 and a display screen module 1090 that includes the display screen 500. The processor 1020 has keypad sensor inputs 1040 selectively coupled to the sensors of each of the sub-regions 340, 342 and thus any of the sub-regions 340, 342 coded as 0 are coupled to keypad sensor input designated 0, sub-regions 340, 342 coded as 1 are coupled to keypad sensor input designated 1 etc. The processor 1020 has display screen module control outputs 1050 coupled to control inputs 1060 of the display screen module 1090, and both a data bus 1070 and an address bus 1080 couple the processor to the memory 1030.

Figure 11:
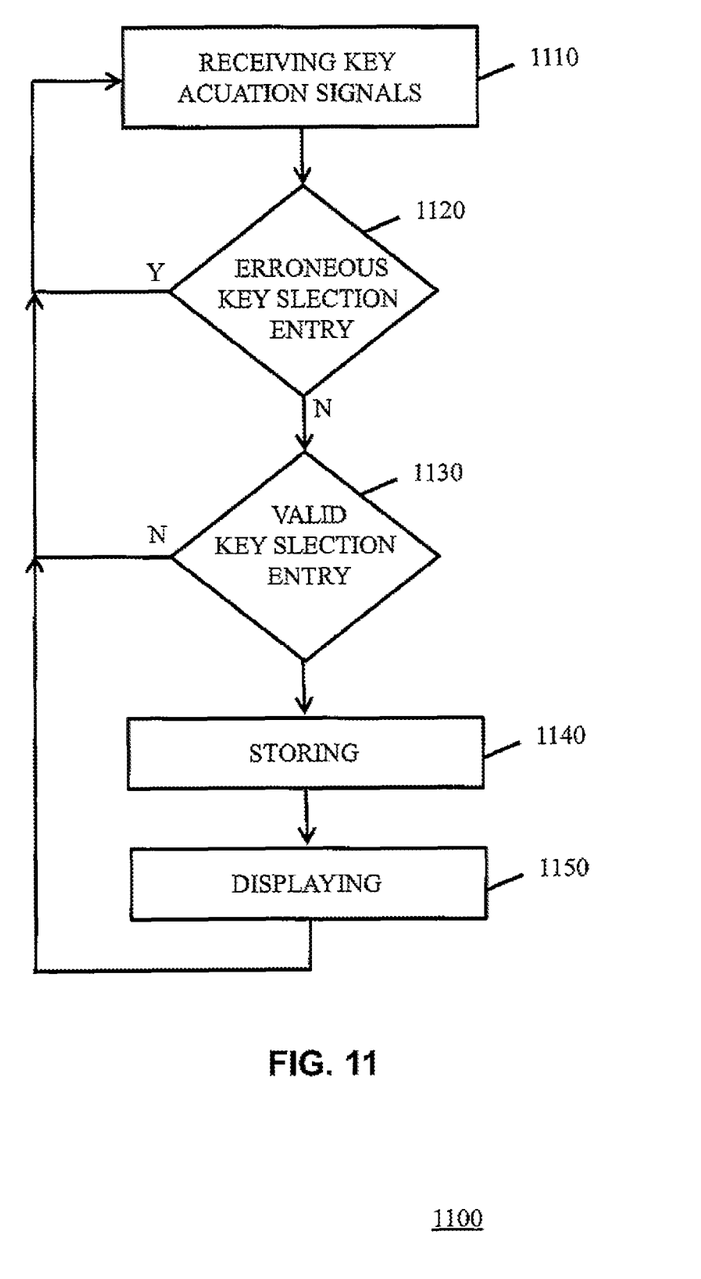
FIG. 11 illustrates a flow diagram of a method for detecting an erroneous key selection entry, in accordance with a preferred embodiment of the present invention.

FIG. 11 is a flow chart of a method 1100 for detecting an erroneous key selection entry. By way of example, the method 1100 will be described with reference primarily to the device 300. The method 1100 includes, at a receiving block 1110, receiving actuation signals sent from the sensors of two of the sub-regions 340,342. In this regard, the key actuation signals can be sent along a common line when then a second sensor 342 of a first key 306 and a proximal first sensor 340 of an adjacent second key 306 are coupled to a common keypad sensor input 940.

At a processing block 1120, the method 1100 performs processing the key actuation signals to detect an erroneous key selection entry when the key actuation signals are generated concurrently from the second sensor 342 of the first key 306 and the proximal first sensor 340 of the adjacent second key 306. If an erroneous key selection entry is detected at block 1120, the processing determines that the erroneous key selection entry is an invalid character entry attempt and thereby the processing refrains from attempting to identify a valid character entry attempt until further actuation signals are generated. As a result, the method 1100 returns to block 1100 and waits for further actuation signals to be generated and received by the processor 920.

If no erroneous key selection entry is detected at block 1120 then further processing is performed at block 1130, this further processing includes detecting a valid key selection entry when the key actuation signals are generated from at least one first sensor 340 and at least one second sensor 342 of the same key 306. If a valid key selection is not detected the method 1100 returns to block 1100 and waits for further actuation signals to be generated and received by the processor 920. Otherwise, when a valid key selection is not detected, the method 1100 at a storing block 1140 performs storing a symbol in a memory of the device in response to the detection of the valid key selection, the symbol being selected by processing of the key actuation signals as will be apparent to a person skilled in the art. At a displaying block 1150, this symbol is then displayed on the display screen or touch screen 304 of the device 300 in the display area 336. The method 1100 then returns to block 1100 and waits for further actuation signals to be generated and received by the processor 920.

If the method 1100 is performed on the device 700 or 800 then at block 1120 the processing further includes the process of detecting an erroneous key selection entry when an actuation signal is provided from the error sensor 704 or 804.

Advantageously when considering devices 300, 500 or 700, if a user attempts to actuate, for example, key "B" but inaccurately touches the keypad between key "A" and key "B", then the right sub-region 242 of key "A" and left sub-region 240 of key "B" will be detected. Since the keypad is firmware coded so that both of these sub-regions are coupled to the common sensor input designated as input number 1, then the signals generated by the keypad can be detected as an erroneous input as only one sensor input signal is received by the processor 920. More specifically, the processor 920 only receives one sensor input signal and thus this must be an erroneous input as sensor input signals are required to determine which key has been selected. Also, if one of the elongate error input sensor regions 704 provides an actuation signal to the processor this also allows the processor 920 to determine that there has been an erroneous key selection (or inaccurate keypad usage). A similar advantage applies considering inaccurate or erroneous usage of the keypad or keypads associated with devices 400, 600 or 800.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. An electronic device, comprising:
    a keypad having a plurality of aligned keys, each of the keys being partitioned into two sensor sub regions, wherein a first one of the sub-regions includes at least one first sensor and a second one of the sub-regions includes at least one second sensor; and
    a processor with a plurality of keypad sensor inputs selectively coupled to the first sensor and second sensor of each of the sub regions,
    wherein the processor is programmed to detect an erroneous key selection entry when key actuation signals are generated concurrently from a second sensor of a first key and a proximal first sensor of an adjacent second key, and
    wherein the processor is further programmed so that in use, when the processor concurrently receives exactly two actuation signals, a valid key selection entry is detected only when the processor identifies the key actuation signals as being sent from at least one first sensor and at least one second sensor of the same key.

2. The electronic device of claim 1, wherein the processor is further programmed to store a symbol in a memory of the device in response to the detection of the valid key selection, the symbol being selected by processing of the key actuation signals.

3. The electronic device of claim 2, wherein in operation the symbol is displayed on a display screen of the device.

4. The electronic device of claim 1, wherein the processor is further programmed to determine that the erroneous key selection entry is an invalid character entry attempt and wherein in operation the processor refrains from attempting to identify a valid character entry attempt until further actuation signals are received.

5. The electronic device of claim 1, wherein the second sensor of the first key and a proximal first sensor of the adjacent second key are coupled to a common keypad sensor input.

6. The electronic device of claim 5, wherein the keypad is an array of keys comprising at least two parallel lines of keys, and wherein the first key and the adjacent second key are located in a first one of the lines and disposed between the first and second lines is an elongate error input sensor region that includes at least one error sensor coupled to one of the keypad detector inputs.

7. The electronic device of claim 6, wherein in use when the processor receives an actuation signal from the error sensor the erroneous key selection entry is detected.

8. The electronic device of claim 1, wherein the keypad is a touch sensor user interface and the sensors are touch sensors.

9. The electronic device of claim 8, wherein the keypad is integrated into a touch screen.

10. An electronic device, comprising:
    a keypad having a plurality of aligned keys, each of the keys being partitioned into two sensor sub regions, wherein a first one of the sub-regions includes at least one first sensor and a second one of the sub-regions includes at least one second sensor; and
    a processor with a plurality of keypad sensor inputs selectively coupled to the first sensor and second sensor of each of the sub-regions, wherein the second sensor of the first key and a proximal first sensor of an adjacent second key are coupled to a common keypad sensor input to thereby provide indistinguishable sub-regions of adjacent keys,
    wherein the processor is programmed to detect an erroneous key selection entry when only a key actuation signal is provided from the common keypad sensor, and
    wherein the processor is further programmed so that in use, upon the processor concurrently receiving two actuation signals, a valid key selection entry is detected only when the processor identifies the key actuation signals as being sent from at least one first sensor and at least one second sensor of the same key.

11. A method for detecting an erroneous key selection entry, the key being one of a plurality of aligned keys of a keypad and each of the keys being partitioned into two sensor sub regions, wherein a first one of the sub-regions includes at least one first sensor and a second one of the sub-regions includes at least one second sensor, the method being performed by a processor with a plurality of keypad sensor inputs selectively coupled to the first and second sensors of each of the sub-regions, the method comprising:
    receiving key actuation signals sent from the sensors of two of the sub-regions;
    processing the key actuation signals to detect an erroneous key selection entry when the key actuation signals are generated concurrently from a second sensor of a first key and a proximal first sensor of an adjacent second key; and
    determining that the erroneous key selection entry is an invalid character entry attempt and then refraining from attempting to identify a valid character entry attempt until further actuation signals are generated.

12. The method for detecting an erroneous key selection entry of claim 11, wherein the processing further comprises detecting a valid key selection entry when the key actuation signals are generated from at least one first sensor and at least one second sensor of the same key.

13. The method for detecting an erroneous key selection entry of claim 12, further comprising storing a symbol in a memory of the device in response to the detection of the valid key selection, the symbol being selected by processing of the key actuation signals.

14. The method for detecting an erroneous key selection entry of claim 13, further comprising displaying the symbol on a display screen of the device.

15. The method for detecting an erroneous key selection entry of claim 11, wherein the second sensor of the first key and the proximal first sensor of the adjacent second key are coupled to a common keypad sensor input.

16. The method for detecting an erroneous key selection entry of claim 11, wherein the keypad is an array of keys comprising at least two parallel lines of keys, and wherein the first key and the adjacent second key are located in a first one of the lines and disposed between the first and second lines is an elongate error input sensor region that includes at least one error sensor coupled to one of the keypad detector inputs.

17. The method for detecting an erroneous key selection entry of claim 16, wherein the processing comprises detecting an erroneous key selection entry when an actuation signal is provided from the error sensor.

* * * * *